United States Patent [19]

Devillard et al.

[11] Patent Number: 4,541,985
[45] Date of Patent: Sep. 17, 1985

[54] PROCESS FOR THE PREPARATION OF A COMPOSITE MATERIAL AND COMPOSITE MATERIAL OBTAINED BY THIS PROCESS

[75] Inventors: Jacques Devillard, Saint Ismier; Jean Granier, Seyssinet, both of France

[73] Assignee: Commissariat a l'Energie Atomique, Paris, France

[21] Appl. No.: 402,131

[22] Filed: Jul. 26, 1982

[30] Foreign Application Priority Data

Aug. 6, 1981 [FR] France .................... 81 15275

[51] Int. Cl.$^4$ .................... B22F 1/04
[52] U.S. Cl. .................... 419/10; 419/11; 419/13; 419/14; 419/19; 419/49; 419/54; 419/60; 419/57; 252/503; 252/504; 252/511
[58] Field of Search .............. 252/503, 504, 502, 511; 75/211, 213, 214, 221, 224, 225; 419/10, 11, 13, 14, 19, 49, 54, 60, 57

[56] References Cited

U.S. PATENT DOCUMENTS 4,110,515 8/1978 Gupta .................... 429/104

FOREIGN PATENT DOCUMENTS 2718308 1/1979 Fed. Rep. of Germany .
2054664 4/1971 France .
2115254 7/1972 France .
2285687 4/1976 France .

Primary Examiner—Josephine L. Barr
Attorney, Agent, or Firm—Pearne, Gordon, Sessions, McCoy, Granger & Tilberry

[57] ABSTRACT

Process for the preparation of a composite material incorporating an inorganic matrix in which are distributed inclusions of carbon-containing material, where it comprises the following stages:

(a) mixing an inorganic powder with a liquid or viscous resin, which can be transformed into vitreous carbon by heat treatment,
(b) subjecting the mixture of resin and inorganic powder to a first heat treatment performed under conditions such that the resin is hardened by crosslinking or polycondensation, and
(c) subjecting the thus obtained hardened product to a second heat treatment for transforming the resin into vitreous carbon and thus forming said vitreous carbon inclusions.

The composite material obtained comprises a copper matrix in which are uniformly and homogeneously dispersed vitreous carbon inclusions, the vitreous carbon content being at the most 8% by weight.

The material is used in the production of electric contacts.

16 Claims, 3 Drawing Figures

PROCESS FOR THE PREPARATION OF A COMPOSITE MATERIAL AND COMPOSITE MATERIAL OBTAINED BY THIS PROCESS

BACKGROUND OF THE INVENTION

The present invention relates to composite materials comprising an inorganic matrix in which are distributed inclusions of carbon-containing material, constituted by inclusions of vitreous carbon and/or graphite and/or carbides.

Such composite materials can be used in numerous fields and in particular in the mechanical and electrical engineering industries as electrical contact and/or friction materials.

More specifically, the invention relates to a process for the preparation of composite materials incorporating inclusions of vitreous carbon having controlled dimensions and distributed in a substantially uniform and regular manner within a preferably metallic, dense or porous inorganic matrix.

It is pointed out that vitreous carbon is an artificial variety of the carbon obtained by pyrolysis, under strictly controlled conditions, of crosslinked polymers obtained by the polycondensation of phenols and aldehydes. The carbon obtained during this pyrolysis is called vitreous carbon due to its appearance, hardness, fragility (comparable to that of porcelain) and impermeability to gases comparable to that of glass.

In order to obtain this vitreous carbon, pyrolysis of the crosslinked polymer is carried out in such a way that the three-dimensional lattice of the polymer is retained throughout the operation and gives this special structure to the end product.

Vitreous carbon has interesting properties for various applications. Thus, bearing in mind its special structure defining micropores, which are not in communication with one another and which do not issue onto the surface of the material, the latter has a low density of approximately 1.45, whereas that of graphite is 2.2. Moreover, its mechanical properties are close to those of pyrolytic graphite or pyrocarbon. It has a thermal conductivity of approximately 0.04 to 0.08 Joule/cm$^{-1}$.°C.$^{-1}$.s$^{-1}$ and an expansion coefficient of approximately 3 to $5.10^6$.°C.$^{-1}$ at 100° C. and $20.10^{-6}$.°C.$^{-1}$ at 1500° C., so that it has a remarkable resistance to thermal shocks. Moreover, vitreous carbon has a resistance to oxidation which is higher than that of other varieties of carbon and graphite, whilst more particularly having a good resistance to oxidation by oxygen, water vapour or carbon dioxide gas.

It is also possible to improve the mechanical, thermal and/or chemical properties of certain inorganic materials by adding vitreous carbon to them. For many years, attempts have been made to produce composite materials having either vitreous carbon inclusions or a vitreous carbon covering. However, the processes used up to now have not made it possible to obtain a composite material having an inorganic matrix in which vitreous carbon inclusions with controlled dimensions are dispersed in desired proportions.

BRIEF SUMMARY OF THE INVENTION

The present invention specifically relates to a process for the preparation of a composite material incorporating inclusions of carbon-containing materials and in particular vitreous carbon, making it possible to obtain a uniform and regular dispersion of these inclusions within a porous or compact inorganic matrix, whilst controlling the maximum size of these inclusions, as well as the carbon-containing material content of the product obtained.

Thus, the present invention relates to a process for the preparation of a composite material incorporating an inorganic matrix in which are distributed inclusions of carbon-containing material, wherein it comprises the following stages:

(a) mixing an inorganic powder with a liquid or viscous resin, which can be transformed into vitreous carbon by heat treatment, (b) subjecting the mixture of resin and inorganic powder to a first heat treatment performed under conditions such that the resin is hardened by crosslinking or polycondensation, and (c) subjecting the thus obtained hardened product to a second heat treatment for transforming the resin into vitreous carbon and thus forming said vitreous carbon inclusions.

The fact of starting with a mixture incorporating a resin in the liquid state and a powder of the material constituting the matrix and producing in situ the vitreous carbon inclusions in the mass of the product by heat treatment of the mixture makes it possible not only to obtain a homogeneous distribution of these inclusions but also to control on the one hand the dimensions by acting on the grain size distribution of the starting powder, and on the other hand the vitreous carbon content of the product obtained by acting on the resin content in the mixture.

Thus, it has been found that the dimensions of the inclusions increase with the grain size of the inorganic powder. Moreover, it has been found that the vitreous carbon content of the product increases with the resin content of the starting mixture.

Conversely, it has been found that the dimensions of the inclusions only depend very slightly on the resin content of the starting mixture. Thus, the process according to the invention makes it possible to effectively and economically check the composition of the product independently of the control of the size of the inclusions.

Moreover, by mixing a resin in the liquid state with an inorganic powder with a controlled grain size, it is possible to obtain a homogeneous paste having an open porosity so that, during the two heat treatments, it is possible to ensure the discharge of the gases released, thereby preventing the formation of a large and irregular porosity and also the appearance of cracks.

Advantageously, before performing the first heat treatment, the mixture of the resin and the inorganic powder undergoes a shaping operation by cold compression in order to obtain a preform or pellet.

This compression operation can be performed by pressing, spinning, rolling or extrusion so as to bring the paste into the form of sheets, cylinders, etc. However, it is preferably performed under conditions such that the paste does not become compact in order to permit the discharge of the gases during subsequent heat treatments.

However, it is possible to perform the heat treatments on a compact paste. However, in this case it is necessary to subject the material obtained to a complementary densification operation, optionally after grinding, in order to eliminate the porosity.

According to the invention, the inorganic powder used is a frittable powder, i.e. an inorganic material which can be shaped and consolidated by powder metallurgy procedures. Moreover, this inorganic material is chosen in such a way that it is not fusible at the temperatures used for the first and second heat treatments. Inorganic materials which can be used are metals, such as copper and nickel, alloys, ceramics such as oxides, carbides and nitrides, e.g. boron nitride, and metal ceramics or cermets. It is also possible to use coated powders or mixtures of powders of different materials, e.g. materials able to react with one another under the treatment conditions to form a liquid phase.

The grain size distribution of the inorganic powder used is chosen as a function of the size of the inclusions which it is desired to obtain. Generally, a powder with an average grain size between 0 and 600 $\mu$m is used.

According to the invention, the resin used is advantageously a liquid resin containing phenol radicals (such as phenol, resorcinol, naphthalene diol, etc) and aldehydes (such as formal, glyoxal, furfuraldehyde, etc). Preferably, the liquid resin is a phenol formaldehyde resin.

Advantageously, the mixture of the resin and the inorganic powder contains at the most 20% by weight of resin.

According to the invention, the first heat treatment is advantageously performed at a temperature at the most equal to 350° C. for 1 to 3 hours. During this first heat treatment, the resin is polycondensed, which leads to the formation of a solid crosslinked polymer and to the obtaining of a hardened product. Due to the porosity of the initial paste, the gases given off during this reaction can be evacuated, which makes it possible to prevent the formation of a large porosity and/or the formation of cracks in the hardened product. The hardened product then undergoes a second heat treatment to transform the solid polymer into vitreous carbon. This second treatment must be performed under strictly controlled conditions, so as to maintain the three-dimensional lattice of the solid crosslinked polymer.

Thus, during the performance of the heat treatment, it is in particular necessary to check the temperature rise speed, as well as the treatment temperature and duration. Advantageously, the second treatment is performed under vacuum or under a neutral atmosphere at a temperature of 600° to 1100° C. for 30 to 50 hours. The temperature is preferably raised in such a way that the release of the gases resulting from pyrolysis is progressive.

During this treatment, the inorganic powder is partly fritted and in this way a porous matrix containing a homogeneous dispersion of vitreous carbon inclusions is obtained at the end of the treatment.

On obtaining a composite material in which the matrix is dense, the product obtained at the end of this second heat treatment undergoes densification which can be carried out, optionally after grinding or deformation, by conventional powder metallurgy procedures and/or by infiltration using a melted or gaseous compound.

For example, the densification operation can be carried out by fritting under load, by hot isostatic compression, by hot spinning of powder contained in a tight envelope or by hot extrusion.

According to a variant of the process according to the invention adapted to the production of a composite material incorporating inclusions of carbon-containing materials, constituted at least partly by graphite, one starts with a mixture of inorganic powder and liquid resin, to which has been added fine graphite or boron nitrite powder. This is followed by the performance of the first and second heat treatments in the manner described hereinbefore, optionally after shaping the mixture by compression. The composite material incorporating the vitreous carbon inclusions then undergoes a complementary graphitization treatment by raising it to a temperature at the most equal to 2200° C. Under these conditions, the vitreous carbon inclusions are at least partly transformed into graphite. This is obtained through adding graphite or boron nitride powder to the liquid resin, because the vitreous carbon can only graphite with external mechanical agents or additives. In this variant, the inorganic powder used is a refractory powder, which is not fusible under the temperature conditions of the graphitization heat treatment.

According to a second variant of the process of the invention, particularly adapted to the production of composite materials, whose inclusions are in part constituted by carbide, the composite material incorporating the vitreous carbon inclusions obtained at the end of the second heat treatment undergoes a complementary treatment in order to at least partly react the carbon of the inclusions with the matrix and thus form inclusions of carbide dispersed in the said matrix. For example, this reaction can be carried out during a densification operation by hot isostatic compression, which also makes it possible to reduce the porosity which may be formed during the reaction.

The present invention also relates to a composite material obtained by this process and which can be used in the production of electrical contacts.

For this use, the composite material comprises a metallic inorganic matrix, preferably of copper and in which are dispersed vitreous carbon inclusions. In this case, the vitreous carbon inclusions represent at the most 8% by weight of the composite material and they preferably have dimensions smaller than 500 $\mu$m.

In particular, such a material can be used for producing symmetrical electric contact pairs for replacing the contact pairs presently used, such as silver-nickel and silver-copper contacts, in low and medium voltage circuit-breakers. Thus, composite materials according to the invention containing approximately 3% by weight of vitreous carbon have satisfactory properties for this application. Their contact resistance, as well as their erosion resistance remain acceptable during cycles of 5000 interruptions of a nominal current of 100 amperes or after interruptions of a short-circuit current of 1500 to 13,000 amperes. In the case of closing with rebound or chatter, the resistance to welding is also satisfactory, even in the case where there is a short-circuit current. However, during a cycle of 1200 currentless opening and closing operations, the contact resistance can reach an excessively high value if the size of the carbon inclusions exceeds 500 microns (the contact resistance increases during roughly the first 100 operations and then reaches a plateau).

Preference is also given to the use of finely dispersed composite materials, i.e. materials in which the size of the vitreous carbon inclusions does not exceed 500 microns.

However, when using composite copper-graphite contacts under the same conditions, there is an unacceptable rise in the contact resistance during a cycle of 5000 interruptions of a nominal current of 100 amperes, this difference in behaviour probably being linked with the lower reactivity of vitreous carbon as compared with oxygen.

BRIEF DESCRIPTION OF THE DRAWINGS

The invention is described in greater detail hereinafter relative to non-limitative embodiments and the attached drawings, wherein show.

DETAILED DESCRIPTION OF THE PREFERRED EMBODIMENTS

These examples relate to the preparation of composite materials incorporating a copper matrix and vitreous carbon inclusions, such materials being in particular usable as electric contacts in low and medium voltage circuit-breakers. All that is done is to vary the resin contents in the starting mixture and the grain size distribution of the copper powder used. In each example, the composite material is produced in the following manner.

Figure 1:
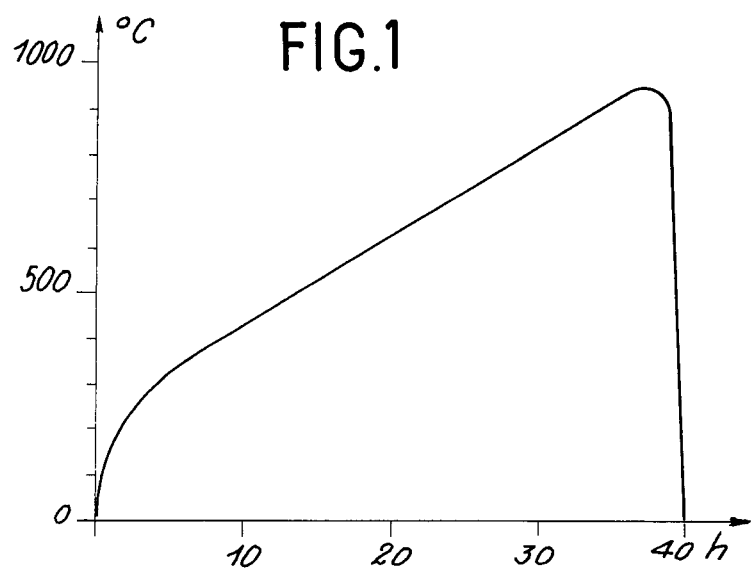
FIG. 1 a diagram illustrating the development of the temperature as a function of time during the second head treatment used for the preparation of composite materials according to the invention.

A paste is prepared by mechanically mixing a copper powder and phenol-formaldehyde resin. The paste is then formed into approximately 70 g cakes or disks and they undergo a first heat treatment at 120° C. in air for 2 hours and a second heat treatment performed under vacuum under the time and temperature conditions represented by the cycle of FIG. 1, which is a diagram representing the development of the temperature (°C.) as a function of time (in hours) during this heat treatment. The thus obtained vitreous carbon-copper porous cakes are then conditioned under vacuum using copper spinning envelopes, spinning then being performed under the following conditions within the envelope:
- preheating temperature: 860° C.,
- spinning ratio: ≈20,
- spinning pressure: 604 bars,
- outlet speed: 50 m/min,
- diameter of spinning pots or tanks: 43.5 mm, except in the case of example 5 where it is 91.5 mm,
- spinneret diameter: 10 mm, except in the case of example 5 where it is 22 mm.

In this way, the various composite materials having the properties given in the following table are obtained. This table also indicates for each example the grain size distribution of the copper powder and the weight ratio of the resin mass to the copper powder mass used.

TABLE

| | Initial mixture. | | Spun material properties. | | |
|---|---|---|---|---|---|
| Example | Grain size of copper powder | Resin mass powder mass (% by weight) | Composition (% by weight of vitreous carbon) | Composite material density. | Size of vitreous carbon inclusions. |
| 1 | 80/520 μm | 7.5 | 3.3 | 7.2 | ≦200 μm |
| 2 | | 12.5 | 5.5 | 6.5 | |
| 3 | | 5.0 | 2.2 | 7.7 | |
| 4 | | 7.5 | 3.3 | 7.3 | |
| 5 | 20/130 μm | 7.5 | 3.4 | 7.1 | ≦50 μm |
| 6 | | 10.0 | 4.8 | 6.7 | |
| 7 | | 12.5 | 6.1 | 6.4 | |
| 8 | 0/40 | 7.5 | 3.3 | 7.2 | ≦15 μm |

TABLE-continued

| | Initial mixture. | | Spun material properties. | | |
|---|---|---|---|---|---|
| Example | Grain size of copper powder | Resin mass powder mass (% by weight) | Composition (% by weight of vitreous carbon) | Composite material density. | Size of vitreous carbon inclusions. |
| 9 | μm | 12.5 | 6.1 | 6.3 | |

These results show that:
- the vitreous carbon content of the composite materials, determined by chemical analysis and expressed as a percentage compared with the total weight of the composite material, is proportional to the resin mass present in the initial mixture,
- the dimensions of the inclusions increase with the grain size of the copper powder, whilst being substantially independent of the overall carbon content,
- the density of the composite materials decreases rapidly as a function of their vitreous carbon content.

By comparing these experimental results with the theoretical curves, it is possible to estimate that the density of the vitreous carbon included in the composite materials is $1.15 \pm 0.6$.

Thus, these results confirm that it is possible to regulate the composition of the material and the size of the inclusions independently of one another by acting respectively on the resin content and the grain size distribution.

Figure 2:
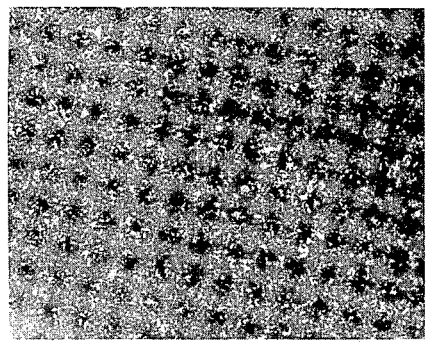
FIGS. 2 and 3 micrographs made respectively on a cross-section and a longitudinal section of the spun material obtained according to example 3.
Figure 3:
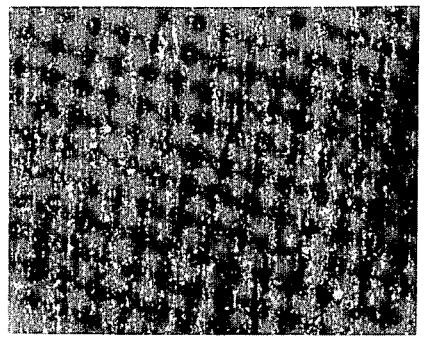

Reference should now be made to FIGS. 2 and 3, which are micrographs made on the cross-section and longitudinal section of the composite material obtained in example 3. It can be seen that the material obtained has an excellent homogeneity.

Moreover, the micrograph carried out on the longitudinal metallographic section shows a tendency to the alignment of the carbon inclusions in the spinning direction, as well as pure copper fibres. It can be seen that the width of these fibres increases with the grain size of the initial powder and decreases slightly when the vitreous carbon content increases.

What is claimed is:

1. A process for the preparation of a composite material having an inorganic matrix and inclusions of carbon-containing material distributed in said matrix comprising the following steps:

(a) mixing an inorganic frittable powder with a liquid or viscous resin which can be transformed into vitreous carbon by heat treatment, said inorganic powder being selected from the group consisting of metals, metal alloys, oxides, carbides, nitrides, cermets and mixtures thereof, said resin being obtained from phenol and aldehyde reactants, the mixture of resin and inorganic powder thus obtained containing at the most 20% by weight of resin, (b) subjecting the mixture of resin and inorganic powder to a first heat treatment performed at a temperature at the most equal to 350° C. for 1 to 3 hours such that the resin is hardened by crosslinking or polycondensation, and (c) subjecting the thus obtained hardened product to a second heat treatment performed under vacuum or in a neutral atmosphere at a temperature of 600° to 1100° C. for 30 to 50 hours for transforming the resin into vitreous carbon and thus forming said vitreous carbon inclusions.

2. A process according to claim 1, wherein before carrying out the first heat treatment, the mixture of resin and powder undergoes shaping by cold compression to obtain a preform.

3. A process according to claims 1 or 2, wherein the inorganic powder is an alloy or metal powder.

4. A process according to claim 3, wherein the inorganic powder is a copper powder.

5. A process according to claim 1, wherein the resin is obtained by the polycondensation of phenol and aldehyde reactants.

6. A process according to claim 5, wherein the resin is a phenol formaldehyde resin.

7. A process according to claim 1, wherein the composite material incorporating the vitreous carbon inclusions obtained at the end of the second heat treatment undergoes densification.

8. A process according to claim 7, wherein this densification is performed by hot spinning.

9. A process according to claim 1, wherein graphite powder is added to the liquid resin and the composite material incorporating the vitreous carbon inclusions obtained at the end of the second heat treatment undergoes a complementary graphitization heat treatment performed at a temperature of at the most 2200° C. for at least partly transforming the vitreous carbon inclusions into graphite.

10. A process according to claim 1, wherein the composite material obtained at the end of the second heat treatment undergoes a complementary treatment in order to at least partly react to the carbon of the inclusions with the inorganic matrix and thus form inclusions of carbide dispersed in the said matrix.

11. A process according to claim 1, wherein the resin is a phenol formaldehyde resin.

12. A process according to claim 1, wherein the inorganic powder is an oxide, a carbide or a nitride powder.

13. A process according to claim 12, wherein the inorganic powder is boron nitride.

14. A process according to claim 12, wherein the inorganic powder is a cermet powder.

15. A process according to claim 7, wherein this densification is performed by hot isostatic compression.

16. A process according to claim 1, wherein boron nitride powder is added to the liquid resin and the composite material incorporating the vitreous carbon inclusions obtained at the end of the second heat treatment undergoes a complementary graphitization heat treatment performed at a temperature of at the most 2200° C. for at least partly transforming the vitreous carbon inclusions into graphite.

* * * * *